United States Patent
Sakal

[15] 3,679,223
[45] July 25, 1972

[54] PORTABLE BABY CARRIAGE

[72] Inventor: Koichi Sakal, 5457-1, Nishijimacho, Hamamatsu-shi, Japan

[22] Filed: Dec. 22, 1970

[21] Appl. No.: 100,707

[30] Foreign Application Priority Data

Dec. 24, 1969 Japan...................................44/10335
Dec. 24, 1969 Japan..................................44/121988
Dec. 24, 1969 Japan..................................44/121989

[52] U.S. Cl.............................................280/37, 280/41 A
[51] Int. Cl..........................................................B62b 11/00
[58] Field of Search..........................280/38, 41 A, 37, 36 B; 297/153, 148, 254, 256

[56] References Cited

UNITED STATES PATENTS

| | | | |
|---|---|---|---|
| 1,125,441 | 1/1915 | Bailey | 280/37 |
| 3,427,069 | 2/1969 | McDonald | 297/153 |
| 2,529,532 | 11/1950 | Abbott | 297/256 |
| 2,564,266 | 8/1951 | Linton | 280/37 |
| 2,625,407 | 1/1953 | Varner | 280/41 A |
| 2,429,763 | 10/1947 | Lindabury | 280/38 |
| 2,994,557 | 8/1961 | King | 297/153 |
| 3,116,069 | 12/1963 | Dostal | 297/254 |

Primary Examiner—Benjamin Hersh
Assistant Examiner—Robert R. Song
Attorney—Karl W. Flocks

[57] ABSTRACT

A perambulator on wheels or baby carriage according to this invention in the form of a rectangular suitcase with a backrest and wheels which are retractable, thus making it easy to carry, the wheels extended or retracted being positively locked in a proper position.

1 Claim, 9 Drawing Figures

PATENTED JUL 25 1972

INVENTOR
Koichi Sakai

BY Karl W. Flocks
ATTORNEY

PATENTED JUL 25 1972 3,679,223

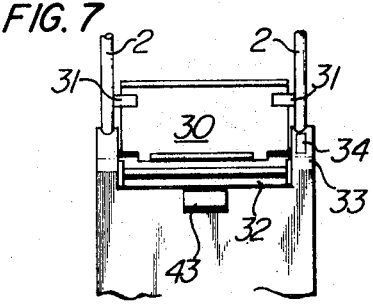
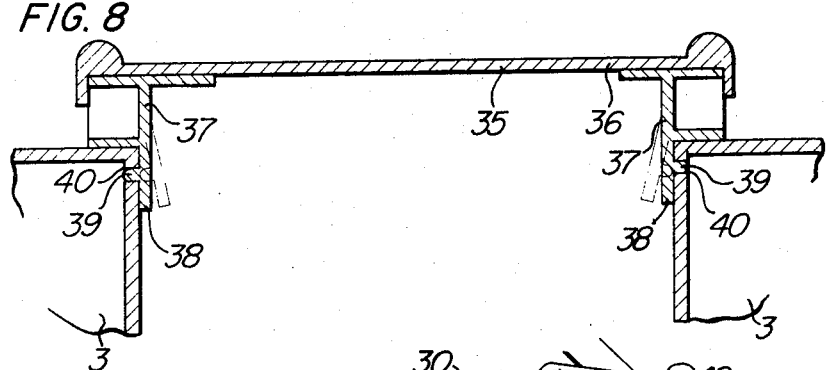
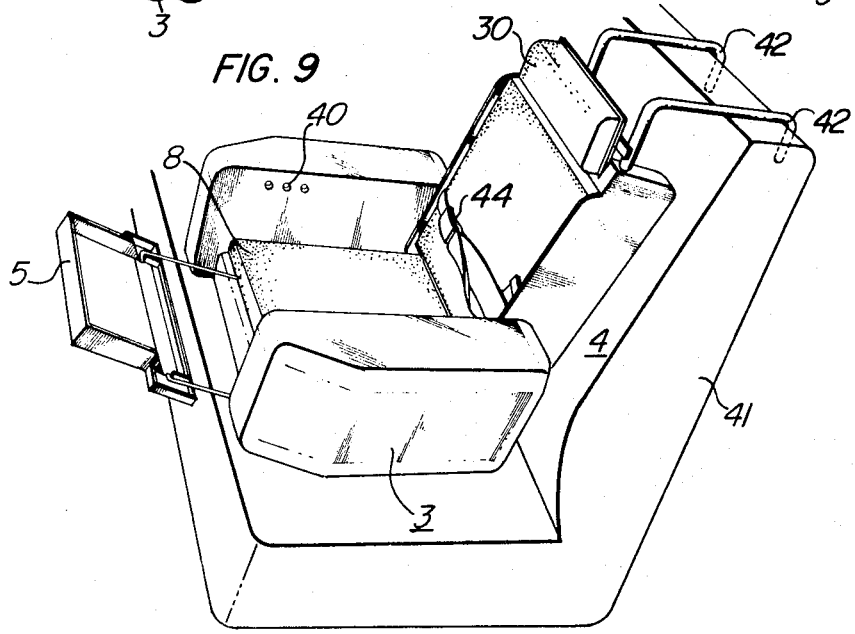

PORTABLE BABY CARRIAGE

This invention relates to a portable type-perambulator on wheels or baby carriage and is particularly concerned with a perambulator or baby carriage in the form of a suitcase or trunk when it is folded up.

The baby carriage in accordance with the present invention comprises a seat portion with a cushion, a backrest with a cushion pivotably secured to the seat portion, cases for receiving a set of wheels, and a foot board adapted to be extended from the seat portion. The backrest portion is normally stored in the space between the cases on both sides of the seat portion and may be erected at a position, such that the baby feels comfortable. A set of wheels consists of a pair of front wheels and a pair of rear wheels, which are extensible from or retractable into cases in order to run the baby carriage along the ground or to carry it in one's hand.

The prior art has provided various baby carriages, that is, pipe construction type-baby carriage, but there is not provided a practical unit of a portable type. A foldable baby carriage of the prior art has been constructed by pipes, which has a set of wheels, a framework of pipes having a base frame and foldable frames, a handle, and a hood. In this case, the wheels are pivotably secured to corner portions of the base frame, respectively. The foldable frames are so assembled that one of the frames crosses to the other pipe-frame and at the crossing portion of the frames a pin is provided so that the frames may be folded. In use, an operator pushes the frames upwards from the base frame and then locks them at a predetermined position by means of any suitable known locking means so that the frames are not shifted down toward their initial position or folded position. After the assembling of the frame structure, the hood is fitted onto the frame. In this prior type, the wheels and the pipe-frames are exposed to view. Therefore, the baby carriage is too bulky to carry about and it is necessary to carry the hood separately from the main frame structure having the wheels. Further, the portable type of baby carriage of the prior art has the defect in that the assembly takes much time and it is almost impossible for a woman to carry or assemble the baby carriage by herself.

The present invention provides a baby carriage having a seat portion, cases for storing a set of wheels which are firmly secured to both sides of the seat portion, a backrest pivotably mounted on the rear portion of the seat portion, a foot board which can extend forwardly from the seat portion, and means for locking of the wheels when the backrest and the foot rest are folded and collapsed, the whole of the baby carriage being in the form of a rectangle, the wheels being so arranged as to be stored within the cases.

An object of this invention is to provide a portable type of a baby carriage wherein the wheels are retracted in cases when carried in one's hand, and in use the wheels are extended, the backrest is then raised, and thus the baby carriage may be readily assembled.

Another object of this invention is to provide a compact baby carriage in the form of a suitcase.

A further object of this invention is to provide a baby carriage which can be used as a spare chair on a seat in a vehicle.

The various objects and features of this invention will be fully understood from the following detailed description of an embodiment thereof, throughout which description reference is made to the accompanying drawings.

FIG. 7 is a top view taken along the line 7—7 in FIG. 3.

FIG. 8 is a sectional view taken along the line 8—8 in FIG. 3.

FIG. 9 is a perspective view of the baby carriage in accordance with the invention showing the carriage located on a seat of a vehicle.

The baby carriage provided is unique and ability to be quickly and easily converted from a suitcase to a baby carriage or a spare seat for a vehicle. Further, the structure hereinafter disclosed is compact, sturdy and reliable, the many styles of this unit being accomplished by the application of suitable materials including synthetic resins or woods.

Figure 1:
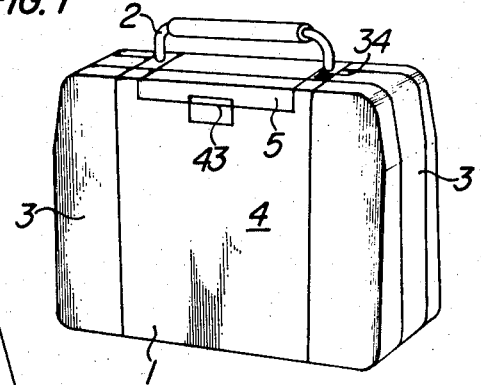
FIG. 1 is a perspective view of a baby carriage constructed in accordance with the invention showing the baby carriage being in the form of a suitcase or trunk.
Figure 2:
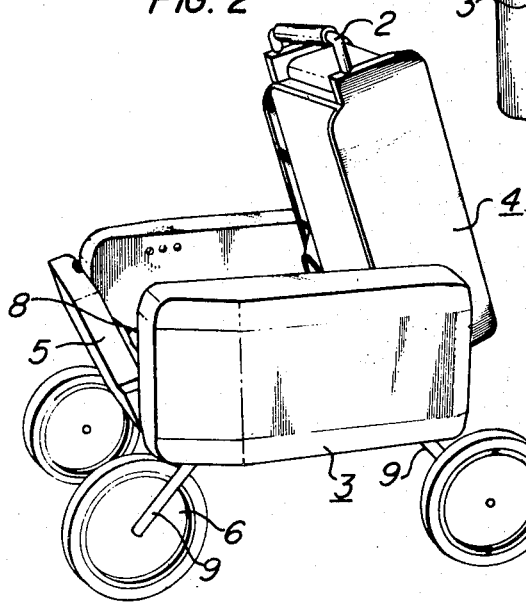
FIG. 2 is a perspective view of the baby carriage showing the wheels and backrest intended to be extended from the seat portion.

Referring to the drawings and, in particular to FIG. 1, a baby carriage 1 in accordance with this invention is in the form of a suitcase and may be carried in one's hand by the use of a handle 2. The baby carriage comprises a seat portion 8 with a cushion, wheel-protecting cases 3, a backrest 4 with a cushion, and a foot board 5. The cases 3 are firmly secured to both sides of the seat portion by means of a fastener such as a nut and bolt (not shown). The backrest 4 is pivotably fixed to the case so as to be located against the upper surface of the seat when folded. Thus, the two cushions on the seat and the backrest are oppositely contoured and nest together in face to face engagement when stored. The backrest 4 may be stored in the space defined by the cases and the seat portion. In use, the backrest 4 is moved upward centering around a pin 12 until the bottom surface of the backrest is seated on the rear portion of the seat. The foot rest 5 is extended forwardly from the seat portion in a proper position so that baby's feet can rest on the foot board. The extension of the foot rest from the seat is accomplished by a rod 43 one end of which is pivotably secured to the foot rest and the other end thereof is slidably mounted to the seat portion.

Figure 4:
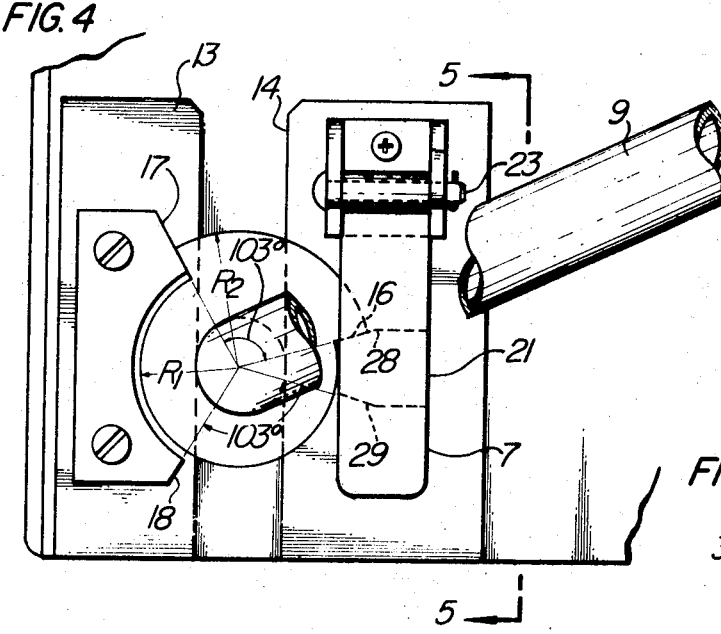
FIG. 4 is a plan view of a locking means at the wheel-storing position.
Figure 5:
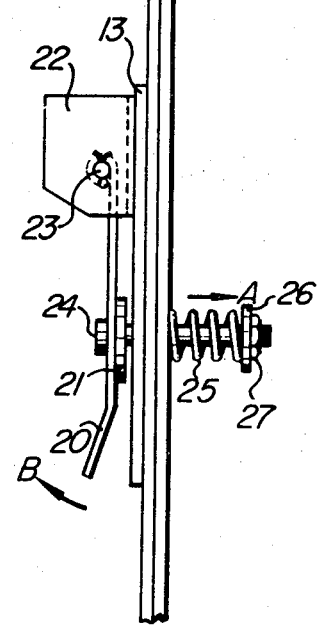
FIG. 5 is a sectional view taken along the line 5—5 in FIG. 4.
Figure 6:
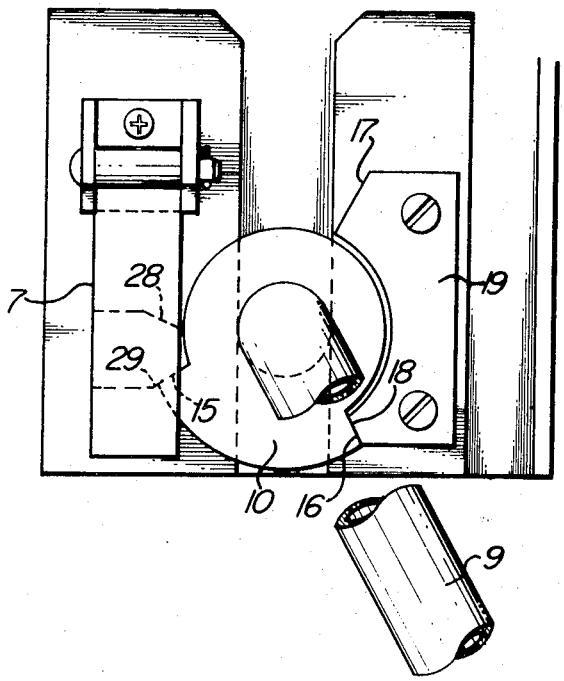
FIG. 6 is a plan view of the locking means at the wheel-extending position.

In the FIG. 4 is illustrated a means capable of storing the wheels within the cases. For the purpose of a simplicity of illustration, in the FIG. 4 the above means on the left side for the front wheels is typically shown. Brackets 10 are welded to a portion of a pipe rod 9 curved in a U-shape, at each end of the rod 9 the wheels are rotatably mounted. The distances between the brackets 10 correspond to the distances of the outer sides of the seat plus the thickness of the cases 3 and reinforcing members 13. The rod 9 is inserted into a cut portion 12 of the seat and the case and then the member 13 is inserted between the wall of the case and the bracket 10 with the aid of a cut portion 14 on the bracket. The members 10 are fixed onto the walls of the case by the use of a suitable fastener. Thus, wheel unit 6 may be pivoted to the cases 3. As seen from the FIG. 4, the member 10 is provided with an outer periphery having a radius $R_1$ and an outer periphery having a radius $R_2$ larger than $R_1$. The sector portion having the radius $R_2$ is about 103 degree. Boundary surfaces 15, 16 have smooth surfaces toward the center point of the bracket. A stopper 19 is fixed to the member 13 and adjacent to the bracket 10, one surface 17 of which is engageable with the surface 15 of the bracket when the wheels are stored within the case as shown in the FIG. 4, further, the other surface 18 thereof is engageable with the surface 16 of the bracket when the wheels are extended from the cases as shown in FIG. 6. At the portion opposite to the stopper 19 a locking means 7 is provided on the member 13. The means comprises a plate 20, a stopper 21 welded on the plate, a channel 22 on the member 13, a pin 23 for pivotably securing the plate 20 on the channel 22, a pin 24 projecting through the stopper 21, member 13 and the side walls of the seat and the case, a spring 25, and a seat member 26 with a nut 27 for the spring. The stopper 21 has two smooth surfaces 28, 29. The stopper is so arranged that one of the surfaces is engageable with the surface 16 of the bracket when the wheels are stored within the cases as shown in FIG. 4, the other surface 29 thereof may be opposed to the surface 15 of the bracket when the wheels are extended. The spring 25 always pulls the plate 20 in the direction of the arrow A so that the bracket 10 never comes under the stopper 21. If the extension of the wheel is desired, after disengaging from the surface 16 and the surface 28 by pushing the end portion of the plate 21 in the direction of an arrow B, they may be extended from the cases by hand. It will be noted that the wheels may be freely extended from the cases without any interference when the above disengagement has been performed. When the surface 16 of the bracket is met to the surface 18 of the stopper 19, by releasing the finger from the plate, the wheels are positively locked at the position extended, because the surface 15 of the bracket may be contacted to the surface 29 of the stopper 19. This condition of the rear wheels is illustrated in the FIG. 6. The above stoppers are provided adjacent to four corners of the seat. However, it will be understood that the locking means 7 may be provided one for each axle and either at the left or right side of the carriage.

A headrest 30 is hinged onto the upper portion of the backrest 4. The headrest 30 may be raised and secured to the rod 2 by pins 31 located pivotably on a part of the rest 30.

Figure 3:
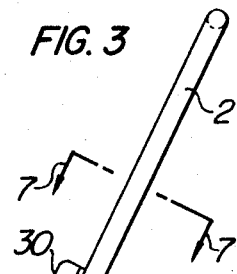
FIG. 3 is an elevational view of the baby carriage showing all elements extended from the main body and a table provided on the baby carriage.
Figure 3:
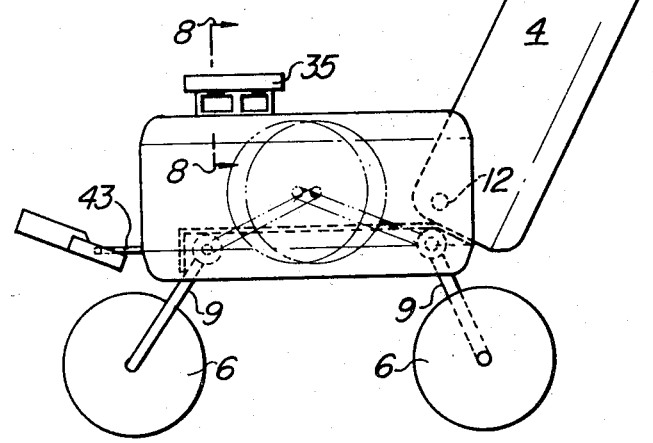

The backrest 4 is of a box-shape. The upper portion thereof is opened and provided with a safety belt 44. When the headrest 30 is not used, the rest 30 is effective in covering the opened portion 32 of the backrest. The rod 2 is slidably installed in the side portions 33 of the backrest 4. A plurality of apertures are bored on the leg of the u-shaped rod 2. The rod 2 is positively secured to the backrest in a proper position by means of a notch 34 on the upper surface 33 of the backrest. In this case, by operating a notch, a pin (not shown) may be entered in one of the apertures on the rod 2 and thus the rod 2 will take positions effective for running or carrying the baby carriage. The position of the rod available for pushing the carriage is shown in the FIG. 3.

The manner of the provision of a table 35 is given in the FIG. 8. The table 35 has a plate 36 and side frames 37. The end portions 38 of the side frames 37 is formed of a flexible synthetic resin and the outer surfaces thereof are provided with a plurality of raised portions 39. Bores 40 are located on the side walls of the cases 3 and the portions 39 are adapted to be entered in the bores 40. The installation of the tables 35 is accomplished by bending inwardly the end portion 38 such as shown in FIG. 8 by imaginary lines and then by inserting the raised portions 39 into the bores 40. The disengagement of the table can be easily done by a reverse operation of the above described procedure.

An example of a spare seat is illustrated in FIG. 9 wherein the wheel retracting carriage in accordance with this invention is resting on the seat 41 in a vehicle. A rod 42 as shown may be substituted for the rod 2. The rod 42 catches the backrest of the seat so that the carriage may be positively seated on the seat in the vehicle.

The rod 42 and the table 35 are stored in the backrest 4 through the opening 32 thereof. When the carriage is carried in one's hand, a lock 43 on the outer surfaces of the backrest and the foot rest is fastened.

The seat portion, the backrest portion and the foot board are made of synthetic resins, various woods, or the suitable materials except for the cushions. The frame for the wheels is of a pipe construction.

It will be understood that various other omissions, substitutions and changes in the form and details of the baby carriage illustrated and in its operation may be made those skilled in the art, without departing from the scope and spirit of the invention.

What is claimed is:

1. A portable baby carriage comprising a seat portion, a backrest pivotally mounted at the rear of the seat portion, a foot rest pivotally mounted at the front of the seat portion, a case firmly secured to each side of the seat portion and adapted to receive a respective pair of front and rear wheels, rear and front axle units each having the wheels at the both ends thereof extend through the side walls of the seat portion, means for holding the wheels in an extended or retracted position, and a substantial U-shaped rod slidably mounted on the upper portion of the backrest and adapted for use as a handle for pushing the carriage when it is extended upward from the backrest and as a grip for carrying the collapsed carriage when it is retracted into the backrest, said holding means comprising brackets fixed to each axle unit at a predetermined space and having a sector portion with a radius larger than the radius of other portions of the bracket, stoppers secured on the inner walls of the cases and adapted to abut the radial surfaces of each sector, and locking means secured on the inner walls of the case and adapted to abut the radial surfaces of at least one of both sectors on each axle unit, the extension and retraction of the wheels being effected by disengaging the sector of the bracket and the locking means and by displacing the axle units into the predetermined position, the carriage being so shaped, on collapsing the carriage, the collapsed carriage is in the form of a suitcase with the wheels received within the respective cases.

* * * * *

UNITED STATES PATENT OFFICE
CERTIFICATE OF CORRECTION

Patent No. 3,679,223　　　　　　　　　Dated　　July 25, 1972

Inventor(s)　Koichi SAKAI

It is certified that error appears in the above-identified patent and that said Letters Patent are hereby corrected as shown below:

In column 1, two instances, the inventor's last name should read: Sakai

Signed and sealed this 26th day of December 1972.

(SEAL)
Attest:

EDWARD M. FLETCHER, JR.　　　　　　　ROBERT GOTTSCHALK
Attesting Officer　　　　　　　　　　Commissioner of Patents